(12) United States Patent
Kajitani

(10) Patent No.: US 9,395,789 B2
(45) Date of Patent: *Jul. 19, 2016

(54) BROADCAST RECEPTION MOBILE TERMINAL

(71) Applicant: Kyocera Corporation, Kyoto (JP)

(72) Inventor: Ichiro Kajitani, Kyoto (JP)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/667,412

(22) Filed: Mar. 24, 2015

(65) Prior Publication Data

US 2015/0198994 A1 Jul. 16, 2015

Related U.S. Application Data

(60) Continuation of application No. 14/245,805, filed on Apr. 4, 2014, now Pat. No. 9,008,721, which is a continuation of application No. 13/282,379, filed on Oct. 26, 2011, now Pat. No. 8,725,195, which is a division of application No. 11/597,019, filed as application No. PCT/JP2005/008901 on May 16, 2005, now Pat. No. 8,073,487.

(30) Foreign Application Priority Data

May 21, 2004 (JP) ................................. 2004-152428

(51) Int. Cl.
*H04M 1/00* (2006.01)
*G06F 1/32* (2006.01)
(Continued)

(52) U.S. Cl.
CPC ............ *G06F 1/3206* (2013.01); *G06F 1/1616* (2013.01); *G06F 1/1647* (2013.01);
(Continued)

(58) Field of Classification Search
CPC ..................... H04M 1/72519; H04M 1/72522; H04W 8/245; H04N 21/47202

USPC ............... 455/550.1, 556.1, 418; 715/86, 716
See application file for complete search history.

(56) References Cited

U.S. PATENT DOCUMENTS 5,818,540 A 10/1998 Mies et al.
6,075,552 A * 6/2000 Hasegawa .............. H04H 20/12
348/192

(Continued)

FOREIGN PATENT DOCUMENTS

CN 1217621 5/1999
JP 11-187327 7/1999

(Continued)

OTHER PUBLICATIONS

Patent Abstract of Japan, Publication No. 2003-309734, dated Oct. 31, 2003.

(Continued)

*Primary Examiner* — Danh Le
(74) *Attorney, Agent, or Firm* — Duane Morris LLP

(57) ABSTRACT

There is provided a broadcast reception mobile terminal capable of improving both electric power saving and user-friendliness includes a broadcast reception mobile terminal that is constructed to be foldable as a result of a lid body arranged to be rotated with respect to a main body, and includes a main LCD panel (202*a*) on an inner surface side of the lid body and a sub LCD panel (202*b*) on an outer surface side of the lid body. A CPU (209) detects that the lid body is opened or closed by a signal from an opening/closing detection switch. In addition, the CPU (209) obtains from an earphone connector (203) information indicating whether or not an earphone is connected. In a case that the CPU (209) detects the lid body being closed during television viewing on the main LCD panel (202*a*), and performing a TVOFF process if the earphone is not connected, and stopping video display but continuing output of received audio if the earphone is connected.

3 Claims, 2 Drawing Sheets

(51) Int. Cl.
- *G06F 1/16* (2006.01)
- *H04N 5/44* (2011.01)
- *H04W 52/02* (2009.01)
- *H04N 5/63* (2006.01)
- *H04N 21/414* (2011.01)
- *H04N 21/443* (2011.01)
- *H04N 21/485* (2011.01)
- *H04N 5/60* (2006.01)
- *H04M 1/02* (2006.01)
- *H04M 1/60* (2006.01)

(52) U.S. Cl.
CPC ............ *G06F 1/1677* (2013.01); *G06F 1/3203* (2013.01); *G06F 1/3265* (2013.01); *H04N 5/4401* (2013.01); *H04N 5/60* (2013.01); *H04N 5/63* (2013.01); *H04N 21/41407* (2013.01); *H04N 21/4436* (2013.01); *H04N 21/485* (2013.01); *H04W 52/027* (2013.01); *H04M 1/0214* (2013.01); *H04M 1/0245* (2013.01); *H04M 1/6058* (2013.01); *H04M 2250/16* (2013.01); *Y02B 60/50* (2013.01)

(56) References Cited

U.S. PATENT DOCUMENTS

| | | |
|---|---|---|
| 6,441,868 B1 | 8/2002 | Park |
| 7,058,426 B2 | 6/2006 | Masuda et al. |
| 7,212,253 B1 | 5/2007 | de Groot et al. |
| 7,389,127 B2 | 6/2008 | Nomiyama et al. |
| 2001/0014974 A1 | 8/2001 | Asada et al. |
| 2002/0001457 A1 | 1/2002 | Iwasaki et al. |
| 2002/0018027 A1 | 2/2002 | Sugimoto |
| 2003/0045245 A1 | 3/2003 | Hikishima |
| 2003/0061285 A1 | 3/2003 | Usui et al. |
| 2003/0064759 A1* | 4/2003 | Kurokawa ......... H04M 1/72519 455/566 |
| 2003/0081120 A1 | 5/2003 | Klindworth |
| 2004/0117179 A1 | 6/2004 | Balasuriya |
| 2004/0215808 A1 | 10/2004 | Homma |
| 2005/0069101 A1 | 3/2005 | Bear et al. |
| 2005/0102701 A1 | 5/2005 | Lin et al. |
| 2005/0191028 A1* | 9/2005 | Matsuda .................. H04N 5/63 386/277 |
| 2005/0213931 A1* | 9/2005 | Kudara .................... H04N 5/76 455/566 |
| 2006/0265726 A1* | 11/2006 | Byun .................... H04H 40/18 725/40 |
| 2006/0271999 A1* | 11/2006 | Wakako ........... H04N 21/41407 725/135 |
| 2007/0073934 A1* | 3/2007 | Rogers ................. G06F 9/4443 710/59 |

FOREIGN PATENT DOCUMENTS

| | | |
|---|---|---|
| JP | 2002-247473 | 8/2002 |
| JP | 2004-104837 | 4/2004 |

OTHER PUBLICATIONS

Patent Abstract of Japan, Publication No. 7-107405, dated Apr. 21, 1995.
Patent Abstract of Japan, Publication No. 336330, dated Nov. 25, 2004.
Patent Abstract of Japan, Publication No. 2005-094418, dated Apr. 7, 2005.
Patent Abstract of Japan, Publication No. 2004-312597, dated Nov. 4, 2004.
Patent Abstract of Japan, Publication No. 2001-339495, dated Dec. 7, 2001.
Patent Abstract of Japan, Publication No. 2002-232549, dated Aug. 16, 2002.
Patent Abstract of Japan, Publication No. 2002-325125, dated Nov. 8, 2002.
Patent Abstract of Japan, Publication No. 00-341379, dated Dec. 8, 2000.
Patent Abstract of Japan, Publication No. 2003-158691, dated May 30, 2003.
International Search Report of PCT/JP2005/008901, date of mailing Jul. 26, 2005.
Chinese Office Action dated Sep. 5, 2008, issued in corresponding Chinese Patent Application No. 2005-800147819.

* cited by examiner

BROADCAST RECEPTION MOBILE TERMINAL

CROSS-REFERENCE TO RELATED APPLICATIONS

This application is a continuation of U.S. patent application Ser. No. 14/245,805 filed on Apr. 4, 2014, which is a continuation of U.S. patent application Ser. No. 13/282,379 filed on Oct. 26, 2011, which is a divisional of U.S. patent application Ser. No. 11/597,019 filed on Nov. 17, 2006 as a U.S. National Phase Application of International Application No. PCT/JP2005/008901 filed on May 16, 2005, which claims priority to Japanese Patent Application No. 2004-152428 filed on May 21, 2004, the disclosures of which are incorporated herein by reference in their entireties.

FIELD OF THE INVENTION

The present invention relates to a broadcast reception mobile terminal for receiving broadcast.

DESCRIPTION OF RELATED ART

For example, a mobile telephone constructed to be foldable with a lid body rotatably arranged with respect to a main body, and including a main display on an inner surface side of the lid body and a sub display on an outer surface side of the lid body is known. In addition, a mobile telephone provided with a tuner so as to view television is also known. In a case of viewing a television program by such a mobile telephone, operations such as a start operation of viewing television and a channel selection, etc., are performed with the lid body open, and a received program is displayed on the main display (see Japanese Patent Laying-open No. 2001-339495, No. 2002-232549, No. 2002-325125, No. 2000-341379, and No. 2003-158691).

DISCLOSURE OF THE INVENTION

Exemplary Problem to be Solved by the Invention

Incidentally, in a digital broadcast reception mobile terminal, it is important to avoid a wasteful electric power consumption. On the other hand, it is not user-friendly to use it if there are many reception interruptions against a user's intention of viewing the broadcast.

In view of the above circumstances, an object of the present invention is to provide a broadcast reception mobile terminal capable of improving both electric power saving and user-friendliness.

Means for Solving Problem

In order to solve the above problems, a broadcast reception mobile terminal according to the present invention is constructed to be made compact by having a lid body being movably arranged with respect to a main body, includes a display on the lid body or on the main body, and in which in a state that the broadcast reception mobile terminal becomes compact, the display is hidden from view. The broadcast reception mobile terminal is configured such that in a state that broadcast received video is displayed on the display and if it is detected that the broadcast reception mobile terminal becomes compact, in a case that audio is output from a speaker, a broadcast receiving process is ended, and on the other hand, in a case that the audio is output from an earphone, the broadcast receiving process is continued so that broadcast audio is output from the earphone.

In addition, a broadcast reception mobile terminal of the present invention is a broadcast reception mobile terminal with a mobile telephone function constructed to be made compact by having a lid body being movably arranged with respect to a main body, appropriately includes a main display and a sub display on the lid body and/or on the main body, and in which in a state that the broadcast reception mobile terminal becomes compact, the main display is hidden from view and the sub display can be seen. The broadcast reception mobile terminal is configured such that in a state that broadcast received video is displayed on the main display and if it is detected that the broadcast reception mobile terminal becomes compact, in a case that audio is output from a speaker, a broadcast receiving process is ended, and on the other hand, in a case that the audio is output from an earphone, the broadcast receiving process is continued so that broadcast audio is output from the earphone, and in addition, a standby screen is displayed on the sub display.

In addition, a broadcast reception mobile terminal according to the present invention is constructed to be made compact by having a lid body being movably arranged with respect to a main body, appropriately includes a main display and a subdisplay on the lid body and/or on the main body, and in which in a state that the broadcast reception mobile terminal becomes compact, the main display is hidden from view and the sub display can be seen. The broadcast reception mobile terminal is configured such that in a state that broadcast received video is displayed on the main display and if it is detected that the broadcast reception mobile terminal becomes compact, in a case that audio is output from a speaker, a broadcast receiving process is ended, and on the other hand, in a case that the audio is output from the earphone, and in addition, information obtained by a broadcast reception is displayed on the sub display.

In a broadcast reception mobile terminal of these configurations, said process performed in a state that the broadcast reception mobile terminal becomes compact may be selected by a user setting.

In addition, a broadcast reception mobile terminal according to the present invention is a broadcast reception mobile terminal that displays broadcast received video on a display, and outputs broadcast received audio from a speaker or an earphone, comprising means for detecting a remaining battery amount, in which in a case that the remaining battery amount falls below a predetermined amount, output of the broadcast received audio is continued, and on the other hand, display of the broadcast received video is terminated.

In addition, a broadcast reception mobile terminal according to the present invention is a broadcast reception mobile terminal that displays broadcast received video on a display, and outputs broadcast received audio from a speaker or an earphone, comprising a predetermined button, in which in a case that the predetermined button is; operated, output of the broadcast received audio is continued, and on the other hand, display of the broadcast received video is terminated.

Effect of the Invention

The present invention is capable of improving both electric power saving and user-friendliness.

DESCRIPTION OF THE REFERENCE NUMERALS

Figure 1:
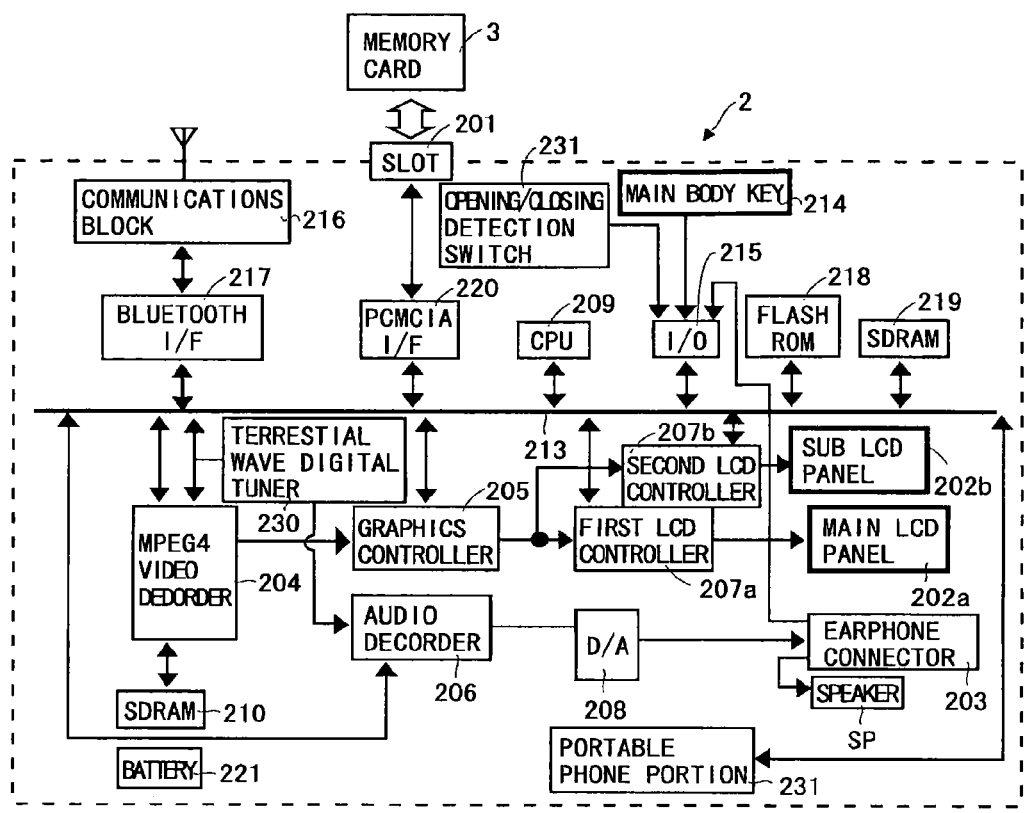
FIG. 1 is a block diagram showing structure of a digital broadcast reception mobile terminal of an embodiment of the present invention.

2 Digital broadcast reception mobile terminal
2a Main body
2b Lid body
202a Main LCD panel
202b Sub LCD panel
205 Graphics controller
207a First LCD controller
207b Second LCD controller
209 CPU

BEST MODE FOR PRACTICING THE INVENTION

Below, an embodiment of the present invention will be described based on FIG. 1 to FIG. 3.

Figure 2:
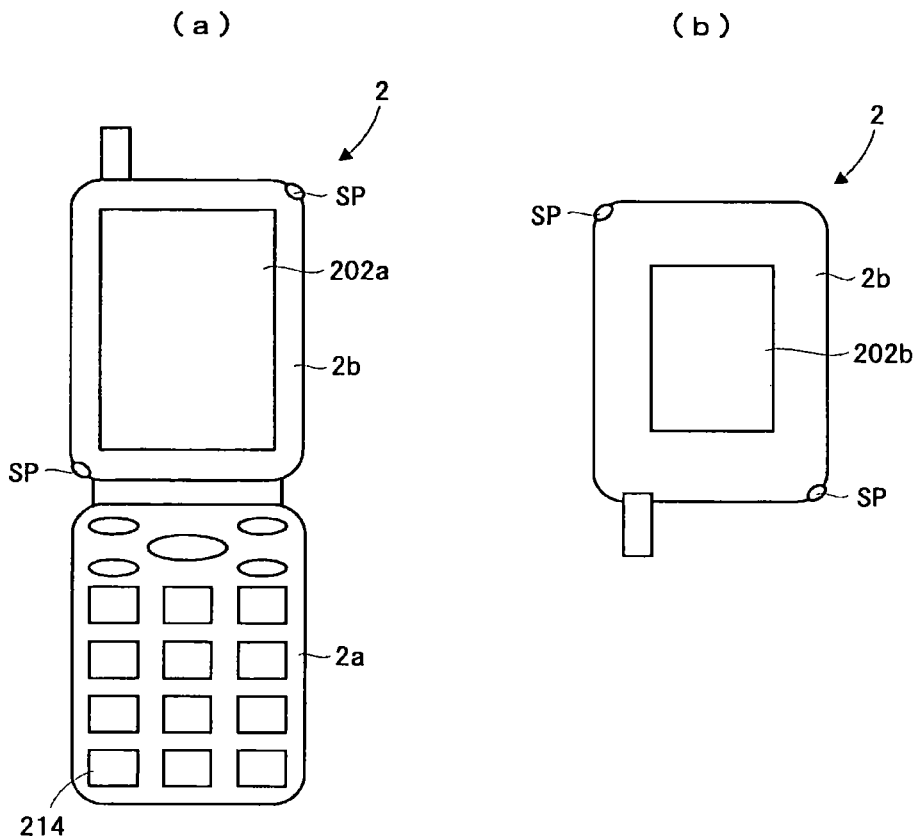
FIG. 2 is a plane view showing an outline of the digital broadcast reception mobile terminal of the embodiment of the present invention, panel (a) of FIG. 2 shows a state that a lid body is opened, and panel (b) of FIG. 2 shows a state that the lid body is closed.
Figure 3:
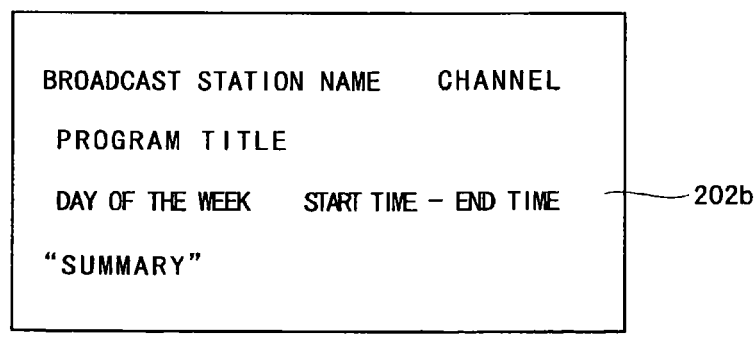
FIG. 3 is an illustrative view showing an example of a display of a sub screen when the lid body is closed.

FIG. 1 is a block diagram showing a digital broadcast reception mobile terminal (with a mobile telephone function) of the embodiment, and FIG. 2 is a plane view showing an outline of the digital broadcast reception mobile terminal 2.

As shown in panel (a) and panel (b) of FIG. 2, the digital broadcast reception mobile terminal 2 of this embodiment is configured to be a foldable digital broadcast reception mobile terminal with a mobile telephone function. That is, the digital broadcast reception mobile terminal 2 is constructed to be foldable by having a lid body 2b being arranged to be rotated with respect to a main body 2a, and comprises a main LCD (liquid crystal display) panel 202a on an inner surface side of the lid body 2b and a sub LCD panel 202b on an outer surface side of the lid body 2b. An opening/closing detection switch 231 detects whether the lid body 2b is opened or closed.

As shown in FIG. 1, based on coded video and audio data obtained as a result of a broadcast reception by a terrestrial digital tuner 230, or coded video and audio data read out from a memory card 3 inserted into a slot 201, etc., the digital broadcast reception mobile terminal 2 displays video on the main LCD panel 202a or the sub LCD panel 202b, and outputs audio from a speaker SP or an earphone not shown. That is, in a state that the earphone is connected to an earphone connector 203, the audio is output from the earphone, on the other hand in a state that the earphone is not connected, the audio is output from the speaker SP. Information on whether or not the earphone is connected is applied to a CPU 209 from the earphone connector 203 via an interface 215. It should be noted that in this embodiment, the above-described coded video and audio data is MPEG4 data, for example.

The MPEG4 data read out from the memory card 3 is applied to an MPEG4 video decoder 204 via a PCMCIA interface 220 and a system bus 213. In addition, the terrestrial digital tuner 230 receives terrestrial digital broadcast from an antenna (not shown) provided on the main body 2a or the lid body 2b, extracts MPEG4 bit stream data broadcast on this terrestrial digital broadcast, and applies this bit stream data to the MPEG4 video decoder 204 or an audio decoder (MPEG4-AAC) 206.

The MPEG4 video decoder 204 decodes the MPEG4 bit stream data so as to evaluate a quantization coefficient and a motion vector, and applies to a graphics controller 205 video data obtained by performing an inverse DCT conversion and a motion compensation control based on the motion vector, etc. The graphics controller 205 performs processes such as a color adjustment, etc., on the video data (R, G, B data, for example). In addition, the graphics controller 205 also performs an OSD (on-screen display) process for displaying on the LCD panels 202a, 202b a text, etc., (a menu screen, etc.) to be output based on an instruction of the CPU 209. The audio decoder 206 decodes the coded audio data in the bit stream to generate audio data. An SDRAM 210 is used for the above process by the MPEG 4 video decoder 204.

A first LCD controller 207a drives the main LCD panel 202a based on the video data applied from the graphics controller 205. A second LCD controller 207b drives the sub LCD panel 202b based on the video data applied from the graphics controller 205. When one of two pairs, that is, a pair of the first LCD controller 207a and the main LCD panel 202a, and the other pair of the second LCD controller 207b and the sub LCD panel 202b, is operated, the other pair is in a non-operating state. The CPU 209 controls which pair is active. A D/A (digital to analog) converter 208 receives the audio data output from the audio decoder 206 and performs a D/A conversion on the audio data so as to generate an analog audio signal.

Keys 214 on the main body include operation buttons regarding viewing television or a telephone, etc., a number keypad, a cursor key, etc. Operation information on the keys 214 on the main body is applied to the CPU 209 via the interface 215 and the system bus 213. The CPU 209 executes a necessary process based on the above operation information.

Furthermore, in order that a close-range wireless network is rendered available, a communication block 216 and an interface 217 are provided. In addition, a FlashROM 218, and an SDRAM 219 are provided, too. Various kinds of setting information by a user are stored in the FlashROM 218, for example. A battery 221 is a rechargeable battery, and is supplied with electric power from a battery charger not shown so as to charge itself.

The CPU 209 performs processes for wireless network, read/write controls of the FlashROM 218 and the SDRAM 219, and so on, and performs various kinds of processes based on information such as earphone connection information from the above opening/closing detection switch 231 and the earphone connector 203.

(1) If a "setting" item is selected on the menu screen, various kinds of setting items are displayed. If a "TV viewing setting when the lid is closed" is selected out of these items, items such as "always TV OFF when the lid is closed", "audio output when the lid is closed", "audio output/video sub-output when the lid is closed", and "audio output/information sub-output when the lid is closed" are displayed. The user operates a cross key (direction key) in order to place a cursor over a desired item, and depresses an Enter key. The CPU 209 stores in the FlashROM 218 as user setting information the item over which the cursor is placed at a time that the Enter key is depressed. In addition, in a case that any one of the items of "audio output when the lid is closed", or "audio output/video sub-output when the lid is closed", or "audio output/information sub-output when the lid is closed" is selected, selection items such as "TV OFF when the earphone is not connected", and "continue TV ON even if the earphone is not connected" are further displayed. The user selects one of the two selection items.

(2) A case that "always TV OFF when the lid is closed" is selected will be described. Upon detecting that the lid is closed while a digital broadcast is viewed, the CPU 209 terminates a receiving process of the digital broadcast and output of the video and the audio (TV OFF). A call standby screen is displayed on the sub LCD panel 202b.

(3) A case that "audio output when the lid is closed" is selected will be described. In a case that "TV OFF when the earphone is not connected" is selected, and if the CPU 209 detects that the lid is closed while the digital broadcast is viewed, the CPU 209 checks the earphone connection information from the earphone connector 203. If the earphone connection information indicates that the earphone is in a connected state, the CPU 209 stops the output of the video of the digital broadcast, but continues the output of the received audio (audio is output from the earphone). If the earphone connection information indicates that the earphone is not in the connected state, the CPU 209 stops both the receiving process of the digital broadcast and the output of the video and the audio (TV OFF). On the other hand, in a case that "continue TV ON even if the earphone is not connected" is selected, the CPU 209 continues the output of the audio without checking the earphone connection information from the earphone connector 203 (audio is output from the earphone or audio is output from the speaker). It should be noted that since the output of the video is not performed, energization to the MPEG4 video decoder 204, the graphics controller 205, an LCD backlight, etc., may be suspended. In the both cases, the call standby screen is displayed on the sub LCD panel 202b.

(4) A case that "audio output/video sub-output when the lid is closed" is selected will be described. In a case that "TV OFF when the earphone is not connected" is selected, and if the CPU 209 detects that the lid is closed while the digital broadcast is viewed, the CPU 209 checks the earphone connection information from the earphone connector 203. If the earphone connection information indicates that the earphone is in the connected state, the CPU 209 outputs the video of the digital broadcast to the sub LCD panel 202b and outputs the received audio, too (audio is output from the earphone). If the earphone connection information indicates that the earphone is not in the connected state, the CPU 209 stops both the receiving process of the digital broadcast and the output of the video and the audio (TV OFF). On the other hand, in a case that "continue TV ON even if the earphone is not connected" is selected, the CPU 209 outputs the video of the digital broadcast to the sub LCD panel 202b and continues the output of the audio without checking the earphone information from the earphone connector 203 (audio is output from the earphone or audio is output from the speaker).

(5) A case that "audio output/information sub-output when the lid is closed" is selected will be described. In a case that "TV OFF when the earphone is not connected" is selected, and if the CPU 209 detects that the lid is closed while the digital broadcast is viewed, the CPU 209 checks the earphone connection information from the earphone connector 203. If the earphone connection information indicates that the earphone is in the connected state, the CPU 209 reads out from the memory program information on the program or accompanied data and broadcast data, outputs the text information to the sub LCD panel 202b, and outputs the received audio, too (audio is output from the earphone) as shown in FIG. 3, for example. If the earphone connection information indicates that the earphone is not in the connected state, the CPU 209 stops both the receiving process of the digital broadcast and the output of the video and the audio (TV OFF). On the other hand, in a case that "continue TV ON even if the earphone is not connected" is selected, the CPU 209 outputs the text information of the digital broadcast to the sub LCD panel 202b and continues the output of the audio without checking the earphone information from the earphone connector 203 (audio is output from the earphone or audio is output from the speaker). It should be noted that in the above case, since the text is displayed, the energization to the MPEG4 video decoder 204 may be suspended.

For further electric power saving, items such as "stop video display when a remaining battery power is insufficient", and "stop video display by a button operation" may be provided in the selection items. In a case that "stop video display when a remaining battery power is insufficient" is selected, if the remaining battery amount falls below a predetermined threshold value, the processing for output of the video is terminated even granting that the video is being displayed on the main LCD panel 202a or the sub LCD panel 202b, and power supply, too, to the backlight, etc., thereof are stopped. The broadcast reception is continued, and the output of the received audio is continued. On the other hand, in a case that "stop video display by a button operation" is selected, if the button is operated, the processing for output of the video is terminated even granting that the video is being displayed on the main LCD panel 202a or the sub LCD panel 202b, and the power supply, too, to the backlight, etc., thereof are stopped. The broadcast reception is continued, and the output of the received audio is continued.

It should be noted that the above example shows a configuration in which there are provided the main LCD panel 202a on the inner surface side of the lid body 2b, and the sub LCD panel 202b on the outer surface of the lid body 2b. However, this is not always the case. For example, the broadcast reception mobile terminal may be constructed to be made compact with the lid body 2b rotatably arranged with respect to a main body 2a, and including a display on the lid body 2b or on the main body 2a, and in which the display is hidden from view in a compacted state (for example, a configuration in which only the main display is provided in the lid body 2b). In addition, the broadcast reception mobile terminal may be constructed to be made compact with the lid body 2b rotatably arranged with respect to a main body 2a, and appropriately including a main display and a sub display in the lid body 2b and/or on the main body 2a (for example, a configuration similar to the above-described example, or a configuration in which a foldable broadcast reception mobile terminal includes the main display on the main body 2a and the sub display on the lid body 2b, and so on), and in which the main display is hidden from view and the sub display can be seen in a compacted state. It should be noted that in the foldable broadcast reception mobile terminal including the lid body arranged to be rotated, it is possible to generate both a state that the main display is hidden from a view and a state that the main display can be seen in a compacted state, and the above processing may be performed in a state that the main display is hidden from a view. Furthermore, in a slide-type or a revolver-type broadcast reception mobile terminal, the display can be seen even when the broadcast reception mobile terminal becomes compact. Such the broadcast reception mobile terminal is preferably provided with the functions of "stop video display when a remaining battery power is insufficient" and "stop video display by a button operation" described above.

In addition, in the above example, the broadcast reception mobile terminal is controlled based on the user setting. However, even if there is no user setting, it may be possible that if the earphone is connected, the audio is output, and the output of the video and the information on the sub screen when the lid body is closed is performed, and if the earphone is not connected, the TV OFF process is performed.

What is claimed is:

1. A mobile terminal comprising:
 a receiving module configured to receive data, the data comprising video and audio data;
 a display module configured to display video based on the video data;
 an output module configured to output audio based on the audio data;
 a first casing;
 a second casing having the display module;
 a state detecting module configured to detect a predetermined state in which the second casing covers at least a part of the display module; and
 a control module configured to cause the display module to terminate displaying of the video and suspend energization of a video decoder of the mobile terminal, but continue outputting the audio if the predetermined state is detected while the video is being displayed and the audio is being output.

2. A method of controlling the display of video and output of audio, comprising:
 receiving data comprising video and audio data;
 displaying video based on the video data on a display screen;
 outputting audio based on the audio data on a speaker;
 detecting a predetermined state in which at least a part of the display screen is covered; and
 terminating displaying of the video and suspending energization of a video decoder, but continuing to output the audio if the predetermined state is detected while the video is being displayed and the audio is being output.

3. A non-transitory computer readable medium storing computer-executable instructions that when executed perform a method of controlling display of video and output of audio, the method comprising:
 receiving data comprising video and audio data;
 displaying video based on the video data on a display screen;
 outputting audio based on the audio data on a speaker;
 detecting a predetermined state in which at least a part of the display screen is covered; and
 terminating displaying of the video and suspending energization of a video decoder, but continuing to output the audio if the predetermined state is detected while the video is being displayed and the audio is being output.

* * * * *